United States Patent [19]

Wiklund

[11] 3,844,051

[45] Oct. 29, 1974

[54] HEADING INDICATOR, ESPECIALLY FOR LAND VEHICLES

[75] Inventor: Klas Rudolf Wiklund, Taby, Sweden

[73] Assignee: Aga Aktiebolag, Lidingo, Sweden

[22] Filed: Sept. 14, 1971

[21] Appl. No.: 180,288

[30] Foreign Application Priority Data
Sept. 18, 1970 Sweden............................ 12757/70

[52] U.S. Cl............................................. 33/317 D
[51] Int. Cl........................................... G01c 17/38
[58] Field of Search.................................. 33/317 D

[56] References Cited
FOREIGN PATENTS OR APPLICATIONS
586,506  3/1947  Great Britain.................... 33/317 D
343,925  10/1936  Italy................................. 33/317 D Primary Examiner—William D. Martin, Jr.
Attorney, Agent, or Firm—Larson, Taylor & Hinds

[57] ABSTRACT

A heading indicator for power-driven units, especially land vehicles, is disclosed which comprises a rate gyro, an integrator controlled by the gyro and a comparator for generating an output signal proportional to the difference between the instantaneous value of azimuthal information from the integrator and a corresponding information from a magnetic course transmitter. The output signal is supplied to a circuit controlling the integrator so as to correct its output azimuthal information in response to said difference. The control circuit comprises a low-pass filter for removing from the output signal of the comparator high-frequency spurious signals. The limiting frequency of the filter is variable in response to the ground speed of the vehicle in the way that the limiting frequency is increased upon an increase in ground speed.

6 Claims, 2 Drawing Figures

HEADING INDICATOR, ESPECIALLY FOR LAND VEHICLES

BACKGROUND OF THE INVENTION

The prior art has, for a long period, been aware of the advantage of using in a heading indicator system for vehicles a rate gyro instead of a complete gyro unit with three shafts. The advantage consists in a considerably lower manufacturing cost which, in turn, stems from the relatively simple mechanical design of a rate gyro as having one sensitive shaft only. On the other hand a rate gyro is inferior to a complete three-shaft gyro on the ground that its output signal does primarily only convey information about changes of the heading, i.e., about azimuthal deviations, whereas it cannot supply any information about the actual value of the heading as referred to some reference line, in general the direction of the field lines of the earth's magnetic field, which would could be used in determination of the actual track of the vehicle. Due to this shortcoming, in order for such actual heading information to be obtained, it is necessary continuously to integrate the output signal from the rate gyro. The simpler design of the rate gyro does, however, also involve a considerably lower accuracy than that characterizing a conventional directional gyro. The error arising upon each heading change is generally of the order of 2°. Furthermore, since the above-mentioned integration of the successive output signals from the rate gyro implies that the corresponding errors are accumulated, it is necessary continuously to compensate for that gyro drift by correcting the output signal.

It is known, as has been indicated above, for the last-mentioned purpose to rely on an integrator controlled by the rate gyro and on a comparator which supplies an output signal proportional to the difference between the azimuthal information derived from the integrator and from a magnetic course transmitter sensing the instantaneous orientation of the vehicle in relation to the magnetic field of the earth. However, when this principle of correction is applied, there arises a most substantial practical problem caused by the fact that the magnetic field lines are not straight but influenced by various disturbing sources. The most usual type of such disturbing sources is major iron constructions, such as bridges, which are especially encountered in densely populated areas. These disturbances modify the magnetic field of the earth in such a way that there is formed a resulting magnetic field having field lines which are curved or irregular in some other manner. When a vehicle equipped with a magnetic heading indicator of the kind above discussed passes through such a disturbed magnetic field the disturbing sources will generate high-frequency spurious signals which are superimposed on the useful primary signal. It is realized that such noise components of the signal may be suppressed by means of a low-pass filter connected to the output circuit of the comparator. Even when equipped with such a filter the accuracy of the heading indicator will still be unsatisfactory.

The main object of the invention is to provide a heading indicator comprising a rate gyro but having a much higher accuracy than has hitherto been obtainable in systems of that type.

Another object of the present invention is to provide a heading indicator which combines low manufacturing costs with high accuracy and operational reliability.

BRIEF DESCRIPTION OF THE INVENTION

A heading indicator designed in accordance with the present invention is of the type comprising a rate gyro, an integrator controlled by said gyro and a comparator generating an output signal proportional to the difference between the azimuthal information from the integrator and from a magnetic course transmitter, respectively. The output signal from the comparator is supplied to a circuit controlling the integrator to correct the heading indication, a low-pass filter being connected in the control circuit for the purpose of removing high-frequency spurious signals in the output signal from the comparator. According to the basic inventive concept the low-pass filter is of such a design that its limiting frequency can be varied in response to external control signals. The last-mentioned signals are supplied by any previously known or suitable means generating signals which are a function of the ground speed of the vehicle. The circuitry should be such that when the frequency of those control signals, generally in the form of distinct pulses, is increased in response to a higher ground speed of the vehicle the limiting frequency of the low-pass filter is lifted to a higher level. While this is no limiting characteristic of the invention, in the practical application thereof it is, as a rule, preferable to make the frequency of the control signal pulses directly proportional to the ground speed of the vehicle. By the same token, when working the invention in practice it is generally preferred to have the filter limiting frequency varying as a linear function of the control signal frequency, i.e., of the ground speed of the vehicle. For reasons which will be accounted for below it is also advisable to block the control circuit acted upon by the comparator when the ground speed of the vehicle drops below a predetermined minimum value.

The integrator unit of the heading indicator system according to the present invention can be of any suitable type. According to one embodiment which will be described in detail below the integrator is constituted by a mechanical servo. In such a case the rate gyro unit can be mounted on the course shaft of the servo which yields a compact and simplified design still further reducing the manufacturing costs.

DETAILED DESCRIPTION OF THE PRESENT INVENTION

Figure 1:
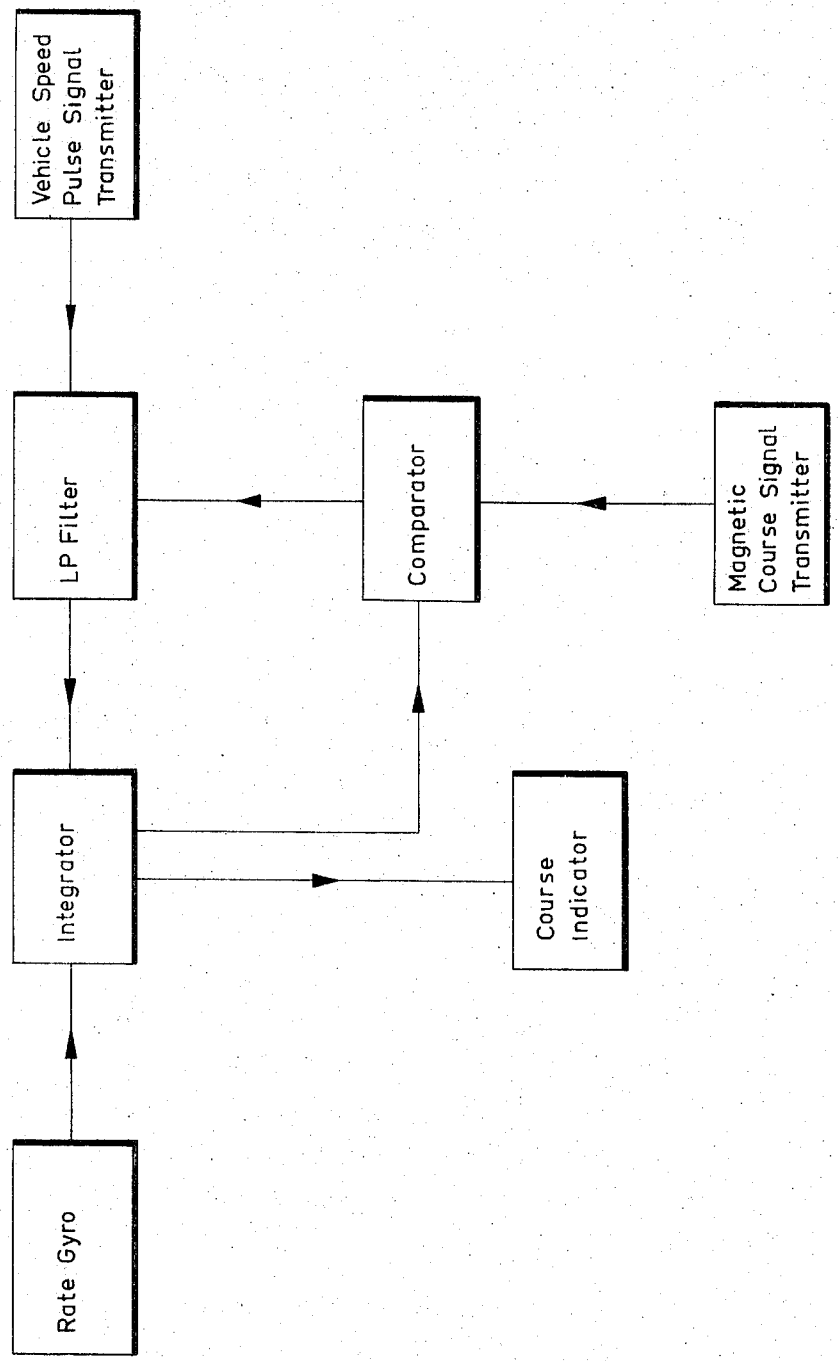
FIG. 1 is a circuit diagram illustrating in block form the general design of a heading indicator system arranged according to the present invention.

The block circuit diagram of FIG. 1 comprises seven different blocks the general characteristics of which will now be briefly described.

From the block labelled "Rate Gyro" there is, in a manner known per se, supplied a signal representing the time derivative of the course. That signal is received by the block named "Integrator" in which the corresponding information is integrated. However, as has been explained above, this integration process will also include the errors stemming from the relatively low inherent accuracy of a rate gyro. As has also been mentioned above, the successive errors arising upon each heading change accumulate in the integration process. To compensate for this phenomenon the integrated output signal is fed to the "Comparator" where it is compared with the output signal from a "Magnetic Course Signal Transmitter." The difference signal representing the result of that comparison is then fed back through a low-pass filter — the corresponding block being labelled "LP Filter" — to the integrator and, after having been so corrected, the heading indicating signal passes from the integrator to the block termed "Course Indicator" which represents any convenient instrument or display unit presenting the heading information in digital or analog, including pictorial, form.

As was also explained above the function of the low-pass filter is to eliminate such high-frequency spurious components in the output signal of the comparator as are generated when the vehicle passes through areas where the magnetic field of the earth is disturbed. The invention takes account of the fact that the frequencies of such spurious signals are proportional to the ground speed of the vehicle and, in conformity therewith, it provides for a continuous matching of the limiting frequency of the filter to the instantaneous ground speed value. This is done by means of control signals in the form of pulses derived from the block labelled "Vehicle Speed Pulse Signal Transmitter." The output signal is, as appears from FIG. 1, supplied from that transmitter to the low-pass filter and controls the filter characteristics by displacing its effective limiting frequency. This displacement can be made in any suitable way one of which will be referred to in connection with the description below of one special embodiment illustrated in FIG. 2.

Figure 2:
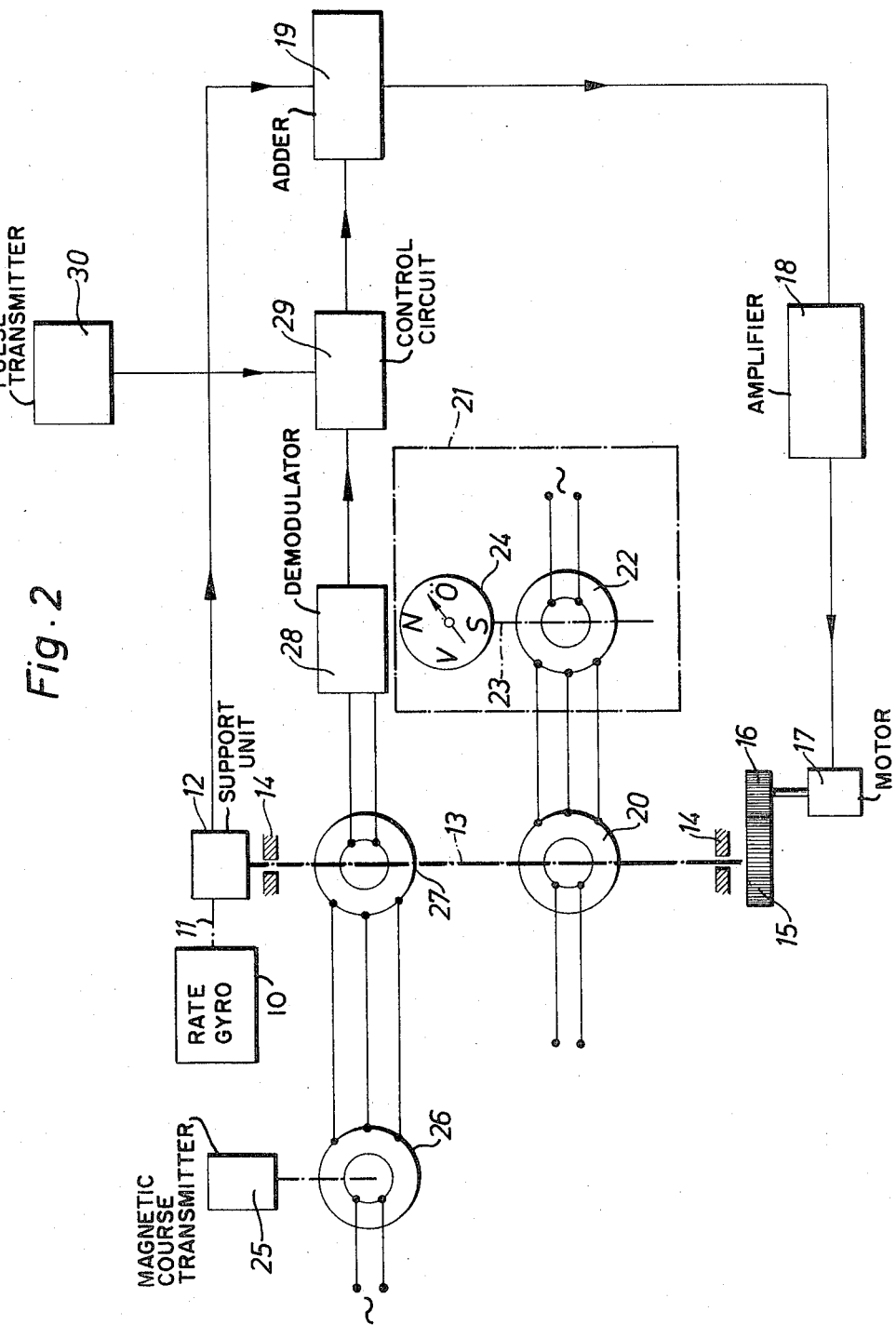
FIG. 2 illustrates diagrammatically a heading indicator according to a special embodiment of the invention.

Turning now to FIG. 2, reference numeral 10 designates a rate gyro having a gimbal the output axis 11 of which is disposed horizontally and rotatably carried by a support 12 also containing the electrical circuitry of the gyro unit. As is known by those skilled in the art, a gyro of this type supplies an output signal that is proportional to the rate at which the gyro rotates around shaft 11. Support 12 is rotatable relatively to the vehicle in which it is mounted and rigidly connected to a shaft 13 diagrammatically shown in dashed lines. Shaft 13 is mounted in bearings 14. At its lower end shaft 13 carries a toothed wheel 15 rigidly secured thereto and engaging a pinion 16 driven by an electric servo motor 17. The rate gyro unit consisting of components 10, 11 and 12 together with shaft 13, gear transmission 15, 16 and the servo motor 17 forms a mechanical servo performing the function of the integrator above described with reference to FIG. 1. The servo loop of this servo unit comprises an amplifier 18 and an adder 19 the operation of which will be described below.

Heading shaft 13 of the mechanical servo carries a synchro 20 the primary circuit of which is fed with an alternating voltage. The three-phase output signal from synchro 20 is supplied to an indicator unit 21 in which the three-phase signal is by means of a second synchro 22 transformed to a mechanical angular movement of a shaft 23 which in turn is directly connected to an instrument 24 indicating the heading of the vehicle.

The operation of the heading indicator above described is as follows. When the heading of the vehicle is changed and the rate gyro unit in response thereto supplies an electrical output signal the latter is supplied, through block 19 and amplifier 18, to the servo motor 17. By means of gear transmission 16, 15 motor 17 then rotates the course shaft of the mechanical servo through an angle equivalent to the azimuthal amount corresponding to the effected course change.

It was mentioned above that the accuracy of a rate gyro is relatively low and also that the integration of the successive heading information signals from the rate gyro, corresponding to successive heading changes, involves accumulation of the errors stemming from that low accuracy. For that reason it is necessary continuously to compensate for this error. This is done by means of a magnetic heading transmitter 25 sensing the orientation of the longitudinal axis of the vehicle relatively to the earth's magnetic field. Heading transmitter 25 is mechanically connected to a third synchro 26 the three-phase output signal of which is applied to a fourth synchro 27. Because of the fact that synchro 27 is mounted on the course shaft 13 of the mechanical servo it will perform as a comparator and deliver an output signal representing the difference between the instantaneous value of the angular position of shaft 13 and the azimuthal information from heading transmitter 25. The output signal from synchro 27 appears as an amplitude-modulated alternating voltage which is fed to a demodulator 28. Demodulator 28 in turn supplies an output signal to a control circuit 29 comprising a low-pass filter removing the spurious signals generated as has been explained above. The filtered output signal from control circuit 29 is then fed to adder 19 where it is added to the signal from the rate gyro unit. Servo motor 17 will in this way, through amplifier 18, receive a correction signal for adjusting the angular position of the servo heading shaft 13 so that the output signal from the comparator 27 equals zero.

In accordance with the present invention control circuit 29 has a second input receiving a signal from a pulse transmitter 30. Transmitter 30 is designed in such a way that it generates pulses the frequency of which is a function of the speed of the vehicle. In accordance with one practical embodiment of the invention the pulse frequency can be selected so that the time interval between two consecutive pulses corresponds to passage of the vehicle along its track a distance within the approximate interval of 1-4 feet. A corresponding information signal is utilized by control circuit 29 to displace the limiting frequency of the low-pass filter so that an increase in the vehicle speed is accompanied by a corresponding increase of the effective limiting frequency of the filter.

According to a preferred embodiment the invention control circuit 29 consists of a filter section formed by an amplifier having a variable amplification factor. In such an application the control operation desired is attained by variation of the amplification factor in response to the speed of the vehicle and preferably as a linear function thereof. The variation in the amplification factor is provided by pulse transmitter 30 which, as stated above, generates pulses having a frequency proportional to the speed of the vehicle. As illustrated, control circuit 29 is connected in a feedback loop which includes adder 19, amplifier 18, motor 17, gearing 15 and 16, shaft 13 and comparator 27, and hence, in accordance with basic principles of feedback amplifier operation, the bandwidth of the amplifier (and thus the pass band of the filter formed thereby) will vary with a variation in the voltage gain or amplification.

Hence, by integrating the pulses from pulse generator 30 to provide a gain control signal, the bandwidth, i.e., filter characteristics, of the control circuit 29 are made to vary with vehicle speed. As will be apparent from the foregoing this operation yields an automatic and continuous compensation of the errors generated due to the fact that the frequency of the spurious signals is a function of the speed of the vehicle. Stated in other words, this compensation could be described as a continuous adjustment of the filter characteristics of the control circuit to the instantaneous speed value. This matching can be made in other ways obvious to those skilled in the art and thus it follows that the principle just described involving amplification factor control represents one only of a plurality of different ways of displacing the effective limiting frequency.

In accordance with a special characteristic of the invention control circuit 29 can also include a switch controlled by pulse transmitter 30 for the purpose of preventing the magnetic heading transmitter 25 from controlling the servo motor when the speed of the vehicle is zero or close to zero. This blocking is made by opening up the servo loop at control circuit 29 which eliminates the risk of local heavy deviations in the resulting magnetic field from generating corrective signals which would cause false heading information.

I claim:

1. A heading indicator comprising a rate gyro, an integrator controlled by the gyro and a comparator generating an output signal proportional to the difference between the azimuthal information supplied from the integrator and from a magnetic heading transmitter, the output signal being delivered to a control circuit of the integrator so as to correct its output azimuthal information signal in response to said difference, the control circuit also comprising means acting as a low-pass filter for removing from the output signal of the comparator high-frequency spurious components therein, the limiting frequency of the filter being variable in response to the ground speed of the vehicle so that an increase in speed is accompanied by an increased limiting frequency.

2. A heading indicator as claimed in claim 1, wherein the means acting as a low-pass filter comprises a means which provides a limiting frequency which is variable as a linear function of the vehicle speed.

3. A heading indicator as claimed in claim 1 wherein said control circuit comprises means for blocking the comparator control circuit when the vehicle speed drops below a predetermined value.

4. A heading indicator as claimed in claim 1, wherein the integrator comprises a mechanical servo.

5. A heading indicator as claimed in claim 4, the rate gyro unit is mounted on the heading shaft of the servo.

6. A heading indicator as claimed in claim 4 wherein the comparator comprises a synchro mounted on the heading shaft of the servo, the magnetic heading transmitter being separately mounted.

* * * * *